UNITED STATES PATENT OFFICE.

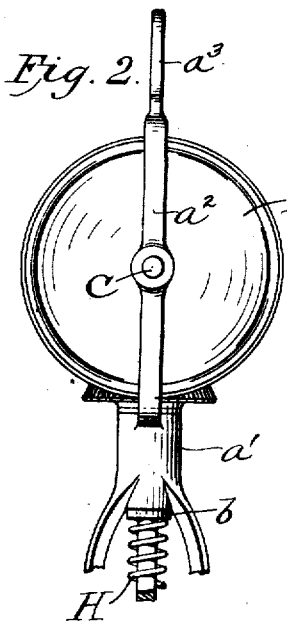
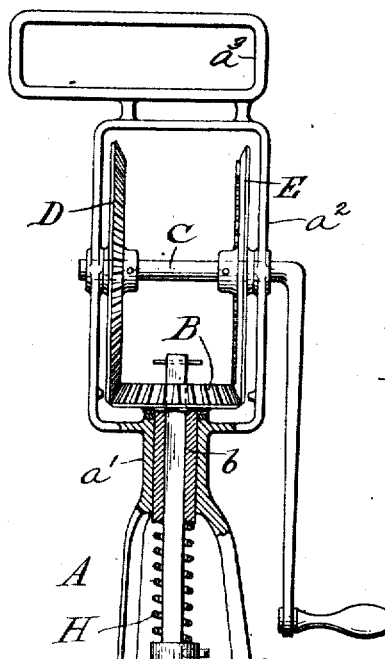
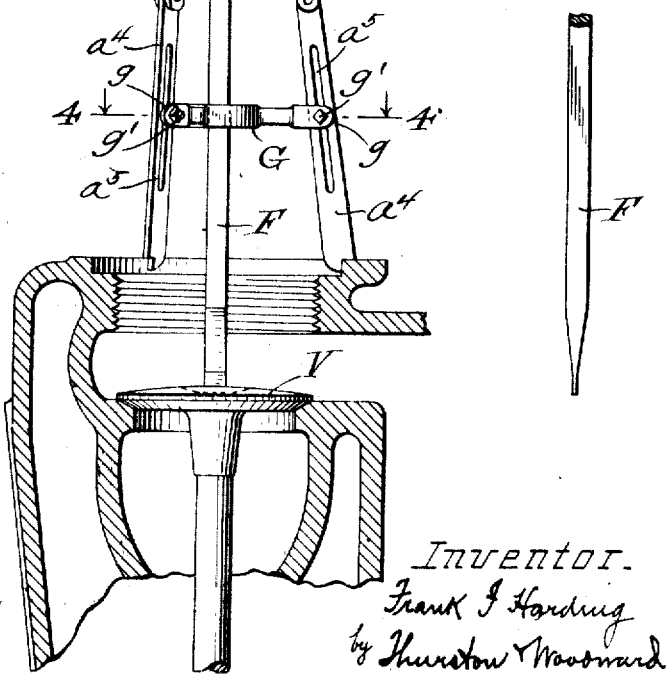

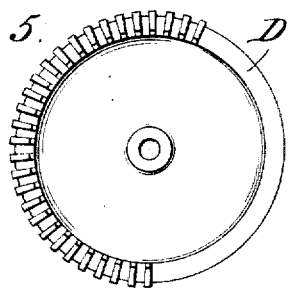
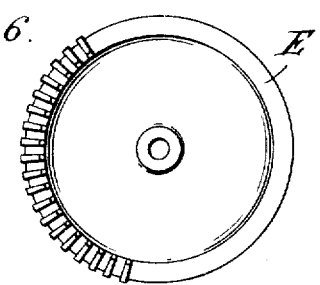
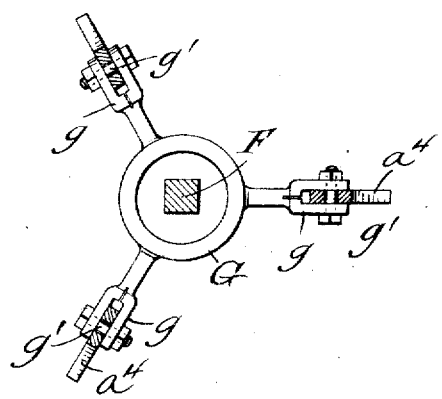

FRANK I. HARDING, OF CLEVELAND, OHIO.

VALVE-GRINDER.

No. 930,472.　　　Specification of Letters Patent.　　　Patented Aug. 10, 1909.

Application filed May 6, 1909. Serial No. 494,415.

*To all whom it may concern:*

Be it known that I, FRANK I. HARDING, a citizen of the United States, residing at Cleveland, in the county of Cuyahoga and State of Ohio, have invented a certain new and useful Improvement in Valve-Grinders, of which the following is a full, clear, and exact description.

This invention is a handy device adapted for use by those who have little mechanical skill, as the owners of motor cars, for grinding and truing up the engaging surfaces of valves and valve seats of engines.

The invention is hereinafter described and definitely pointed out in the claims, and is shown in the accompanying drawings, in which—

Figure 1 is a side elevation partly sectioned of a device embodying the invention. Fig. 2 is an end view from the left side of Fig. 1. Fig. 3 is a side elevation of the lower end of the screw driver part of the device from the right side of the same, as shown in Fig. 1. Fig. 4 is a sectional plan view in the plane of line 4—4 on Fig. 1. Fig. 5 and Fig. 6 are face views of the two gears D and E respectively.

The supporting frame work of the device is of skeleton formation, comprising downwardly diverging legs $a$, a vertical tubular member $a'$ which is connected with the upper ends of said legs, a yoke $a^2$ above this tubular member, and a convenient hand grip $a^3$ at the top of said yoke,—all of said parts being preferably integral parts of the same casting. The tubular member $a'$ serves as the bearing for the downwardly extended tubular hub $b$ of a bevel gear B. A horizontal crank shaft C is rotatively mounted in the side members of the yoke $a^2$, and, within said yoke, two mutilated bevel gears D and E are fixed so as to be adapted to engage with bevel gear B on opposite sides of its axis. The teeth are so placed that as the crank shaft C is turned one gear D or E will engage gear B and turn it in one direction and become disengaged therefrom, and then the other gear (D or E) will engage gear B and turn it in the contrary direction. One of these gears, as D, has more teeth than the other, wherefore the gear B, although turned alternately backward and forward, is turned farther forward than backward.

The tool F is movable endwise through the hub $b$, but has a driving connection therewith. For example it and the hole in the hub may be made angular. A spring H embracing said tool, and compressed between the lower end of hub $b$ and a collar $f$ fixed to the tool, imparts to the tool a tendency to move downward in said hub. The lower end of this tool is formed for engagement with the valve,—as for example, it may be flattened like a screw driver for engagement with a cross slot in the end of the valve V.

In use the lower ends of the legs $a$ are caused to engage with a hole in the engine casing, through which the valve may be reached. Preferably the lower ends of these legs are notched, as shown. When the frame is held firmly down, and the tool is engaging the valve, the crank shaft C is turned, and thereby the valve is pressed against its seat and turned forward and then backward, but farther forward than backward so that the same surfaces of the valve and seat are not constantly rubbing one against the other.

In order to give the tool a wider range of usefulness, it is rendered adaptable to be used with valves which are associated with different sized holes in the engine casing, the lower parts of the legs are formed of hinged sections $a^4$, each of which has a longitudinal slot $a^5$. A spider G has an equal number of arms $g$ each of which is provided with a bolt $g'$ adapted to go through one of these slots, and to serve to clamp the legs $a^4$ and spider arms together. By moving the spider up on the legs their spread may be increased,—and vice versa.

Having described my invention, I claim:

1. In a valve grinder, the combination of a frame comprising a bearing sleeve, legs extending downward therefrom, and a yoke extending upward therefrom, with a beveled gear having a tubular hub which is mounted in said bearing, a horizontal shaft mounted in the yoke, two mutilated beveled gears having unequal numbers of teeth fixed to said shaft and adapted for engagement with said beveled gear, a tool vertically movable through said hub having a driving connection therewith, and a spring acting to move said tool downward through said hub.

2. In a valve grinder, the combination of a frame comprising a bearing sleeve, diverging legs extending downward therefrom, and a yoke extending upward therefrom, and leg sections pivotally connected with the lower ends of the legs which are fast to said bearing sleeve, and a spider having arms and provided with means for fixing said arms to said pivoted leg members at various elevations, with a beveled gear having a tubular hub which is mounted in said bearing, a horizontal shaft mounted in the yoke, two mutilated beveled gears having unequal numbers of teeth fixed to said shaft and adapted for engagement with said beveled gear, a tool vertically movable through said hub but having a driving connection therewith, and a spring acting to move said tool downward through said hub.

In testimony whereof, I hereunto affix my signature in the presence of two witnesses.

FRANK I. HARDING.

Witnesses:
JAMES G. BACHMAN,
JOHN P. DEMPSEY.